(No Model.)
W. H. RYER.
OVEN ATTACHMENT FOR DRUMS.
No. 427,799. Patented May 13, 1890.
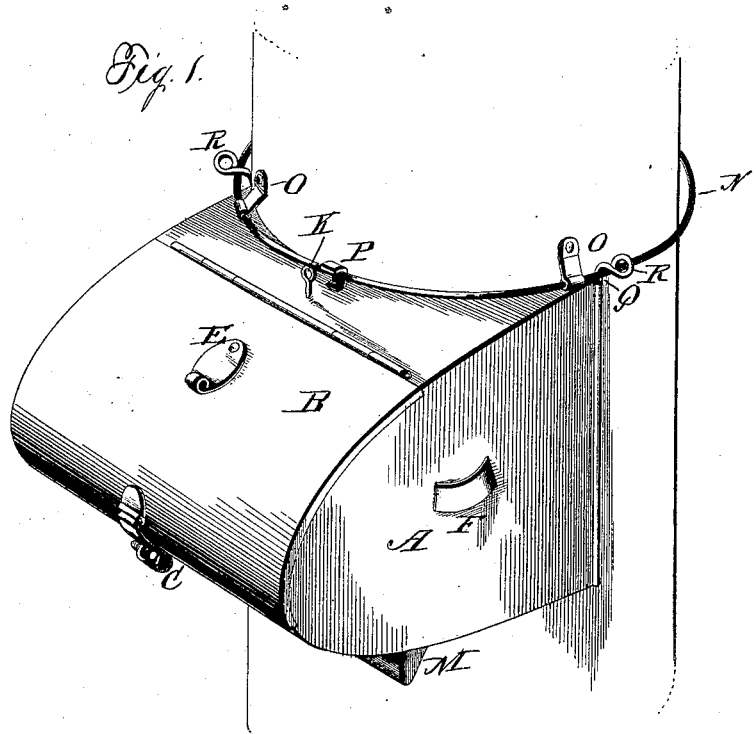
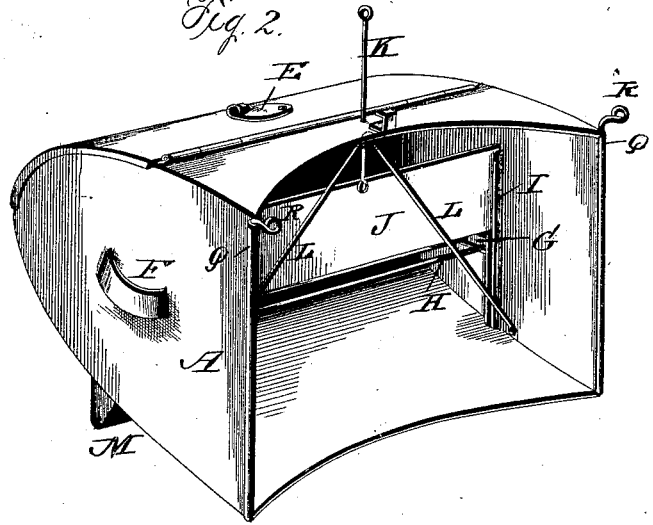
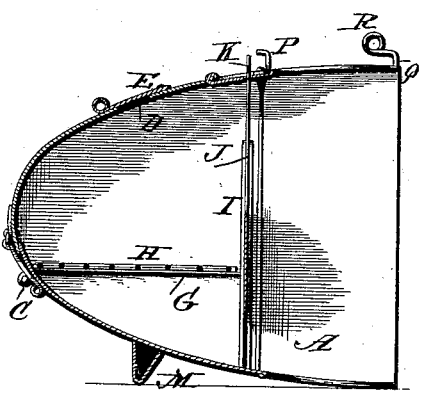
Witnesses
Chas. Williamson
E. H. Bond.
Inventor
William H. Ryer,
per Chas. H. Fowler,
Attorney.

UNITED STATES PATENT OFFICE.

WILLIAM H. RYER, OF STEELE CITY, NEBRASKA.

OVEN ATTACHMENT FOR DRUMS.

SPECIFICATION forming part of Letters Patent No. 427,799, dated May 13, 1890.

Application filed August 26, 1889. Serial No. 321,982. (No model.)

*To all whom it may concern:*

Be it known that I, WILLIAM H. RYER, a citizen of the United States, residing at Steele City, in the county of Jefferson and State of Nebraska, have invented certain new and useful Improvements in Oven Attachments for Drums; and I do hereby declare that the following is a full, clear, and exact description of the same, reference being had to the annexed drawings, making a part of this specification, and to the letters of reference marked thereon.

This invention relates to certain new and useful improvements in oven attachments to stove pipes or drums; and it has for its object to provide a simple and cheap device of this character which may be readily attached to a stove pipe or drum and which in use will be found very efficient in baking bread, cake, and other articles of food.

The invention consists in the peculiar combinations and the construction, arrangement, and adaptation of parts, all as more fully hereinafter described, shown in the drawings, and then particularly pointed out in the appended claims.

The invention is clearly illustrated in the accompanying drawings, which, with the letters of reference marked thereon, form a part of this specification, and in which—

Figure 1 is a perspective view illustrating my improved oven attached to or suspended from a stove pipe or drum. Fig. 2 is a perspective view of the same removed. Fig. 3 is a central longitudinal vertical section through the oven detached.

Like letters of reference indicate like parts throughout the several views.

Referring to the drawings by letter, A designates the oven, which may be made of any suitable material, but preferably tin, and of the form shown—that is, a half oval—with the top and bottom concaved at the rear side, as shown clearly in Fig. 2, to conform to the convexity of the stove pipe or drum, against which it is intended to fit closely. This oven is provided with a hinged cover B, provided with a suitable catch C to hold it closed, and in this cover is a suitable ventilating hole or opening D, covered by a pivoted damper E, as shown. It is also provided at its ends with suitable handles or loops F, by which it may be lifted. Within this oven are secured suitable horizontal guides or strips G, designed to support a rack H to support the bread or cake pans or other receptacle containing the article to be baked.

I are vertical guides secured to the inner walls of the oven at opposite ends, as shown, and J is a damper designed to work in these guides and adapted to fit snugly enough therein to be held in any adjusted position by frictional contact therewith. This damper is provided with a suitable handle or rod K, by which it may be operated, the said rod passing through a suitable hole in the top of the oven. This damper may be adjusted up or down to vary the heat at the desired part of the oven.

L are brace-rods within the oven, secured to the end walls and to the top, as shown in Fig. 2, to strengthen the same.

Near the front edge, upon the under side of the oven, there is secured or formed integral therewith a transverse triangular rib M, designed to serve as a support to keep the oven in a horizontal position when removed from the stove pipe or drum, as shown in Fig. 3.

The oven is connected to the drum preferably in the following manner: N is a ring or band encircling the stove pipe or drum and held thereto at the proper height in any suitable manner, preferably by means of clips O engaging the ring and riveted or otherwise secured to the stove pipe or drum, as shown in Fig. 1. On the top of the oven, near its longitudinal center, is a hook P, which engages this ring, and at each end of the oven is a vertical rod or wire Q, rotatable in suitable sockets, and provided at their upper ends with horizontal portions or hooks R, which, when turned the proper way, engage the ring, as shown in Fig. 1, and may be readily turned to disengage the ring or band when it is desired to remove the oven.

By actual practice it has been found that articles may be baked in this oven in a very short time at a small cost.

What I claim as new—

1. An oven attachment for stove pipes or drums, consisting of a metal shell having concaved rear portion and a vertically-adjustable damper and hooks at the rear corners for attachment to a stove pipe or drum, as set forth.

2. The combination, with the oven, of the vertical rods at the rear corners thereof and held rotatably in socket on said oven, and at their upper ends formed with horizontal portions or hooks, as set forth.

3. The metal oven described, consisting of the shell provided with shelf-supports, vertical guides, a damper movable in said guides, and vertical rotatable hooked rods at the rear corners, substantially as and for the purpose specified.

In testimony that I claim the above I have hereunto subscribed my name in the presence of two witnesses.

WILLIAM H. RYER.

Witnesses:
   A. L. THOMPSON,
   F. C. JOHNSON.